March 20, 1962 J. J. BUNDSCHUH ET AL 3,025,776
APERTURE CONTROL MECHANISM FOR PHOTOGRAPHIC CAMERA
Filed July 28, 1960 2 Sheets-Sheet 1

John J. Bundschuh
Howard G. Quick, Jr.
INVENTORS

BY R. Frank Smith
Robert W. Hampton
ATTORNEYS

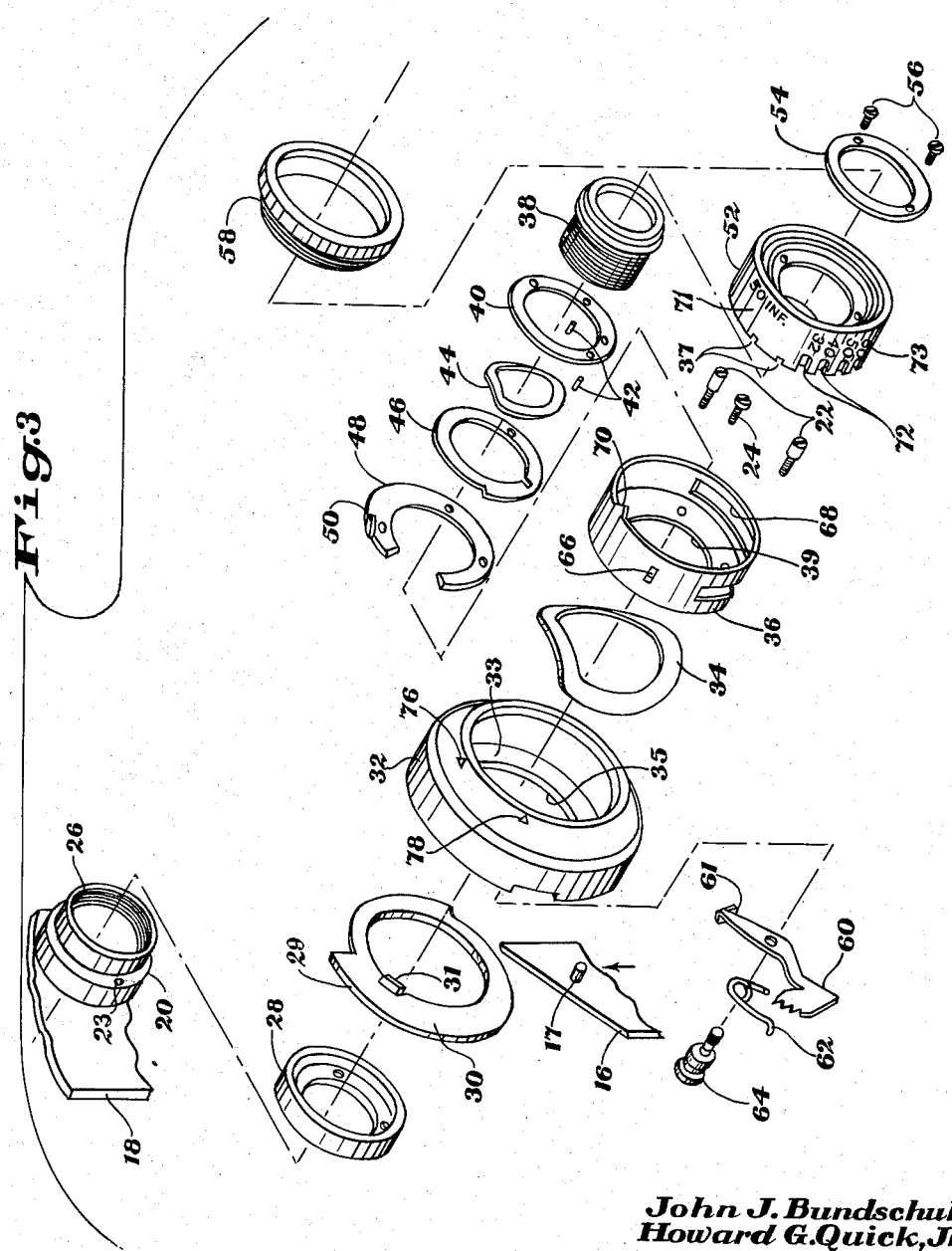

United States Patent Office 3,025,776
Patented Mar. 20, 1962

3,025,776
APERTURE CONTROL MECHANISM FOR
PHOTOGRAPHIC CAMERA
John J. Bundschuh and Howard G. Quick, Jr., Rochester,
N.Y., assignors to Eastman Kodak Company, Rochester, N.Y., a corporation of New Jersey
Filed July 28, 1960, Ser. No. 45,920
3 Claims. (Cl. 95—10)

The present invention relates to photographic cameras having automatic exposure control systems and having adjustable focus, and more particularly concerns means for coupling the focus adjustment to a manual override device for the exposure control mechanism.

Automatic exposure control systems are provided for photographic cameras in order to simplify the operation of such cameras under conditions of daylight operation when a photocell can be employed to adjust the diaphragm opening and/or shutter speed as a function of scene brightness. On still cameras having such exposure control systems and having adjustable focus, it has been necessary, during flash operation, for the operator to adjust the diaphragm opening and/or shutter speed manually as a function of a further manually adjusted focus setting. A system of "flash guide numbers" has been employed to relate the diaphragm opening to the focus adjustment for flash operation, but has required the camera operator to perform a calculation either mentally or with any of various slide rule aids.

It is a principal object of the present invention to couple the focus adjustment of a still camera to a manual override device for an automatic exposure control system in such camera.

Another object of the invention is to permit such coupling to be achieved on a selective basis.

A further object, in a camera having automatic exposure control, a manual override device for such exposure control and a manual focus adjustment, is to permit focus adjustment independently of the manual override device during daylight operation, but to permit the selective coupling of a focus adjustment and manual override device in any of a plurality of relationships for flash operation of the camera.

A further object of the invention is to couple the focus adjustment and manual override device of such a camera in any of a plurality of relationships selected on the basis of flash guide numbers.

Other objects of the invention will appear from the following description, reference being made to the accompanying drawings, wherein:

FIG. 3 is an exploded isometric view of the front surfaces of the elements of the focus and manual override structure.

Figure 1:
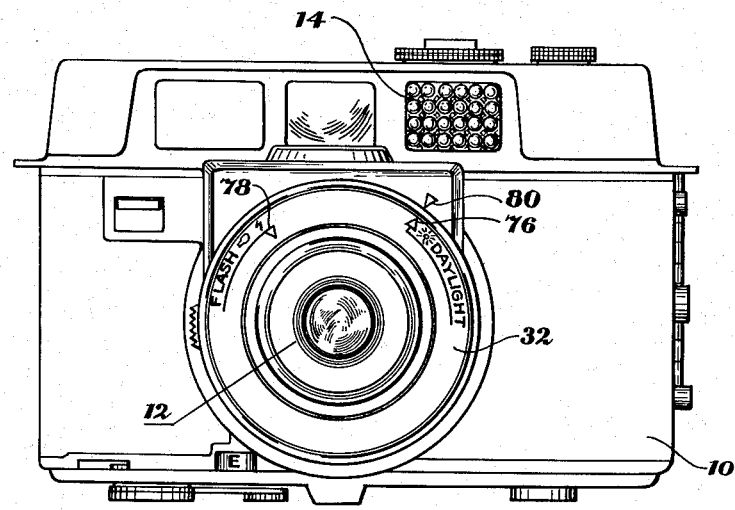
FIG. 1 is a front view of a camera embodying the present invention.

Referring to FIG. 1, a typical still camera embodying the present invention comprises a case 10 on the front surface of which is mounted a taking lens system indicated generally at 12. Also mounted on the front of the camera is a photocell unit indicated at 14, which energizes an exposure control system. The exposure control system may be of the pointer-sensing type well known in the art and disclosed for example in U.S. Patent 2,058,531 to Tuttle. In this type of exposure control system, the pointer of a galvanometer is sensed by a cam member such as shown at 16 in FIG. 3. The details of the exposure control system are not pertinent to the present invention and for the purpose of clarity are omitted from the drawings.

Figure 2:
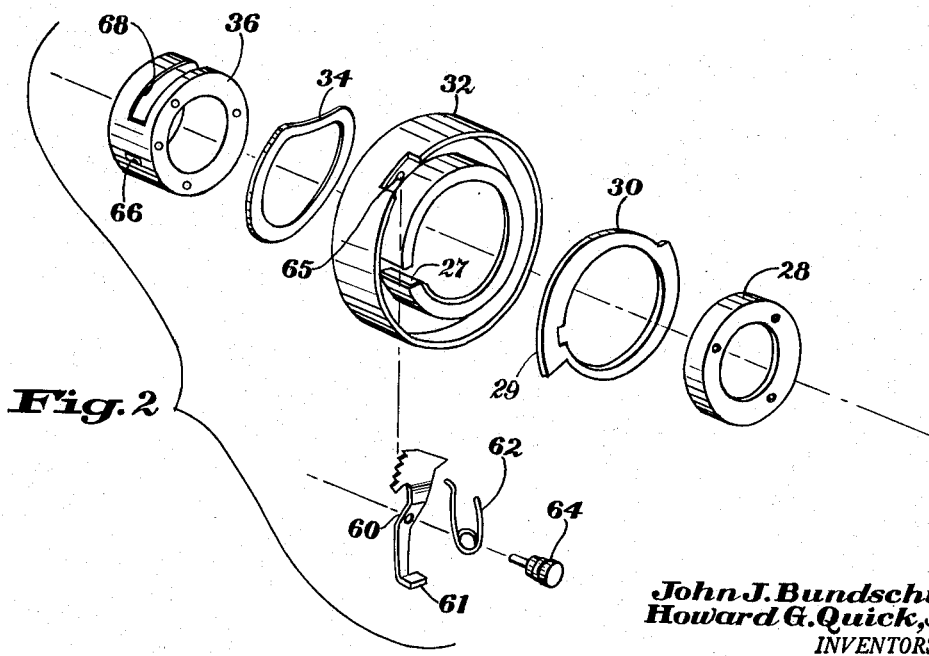
FIG. 2 is an exploded isometric view of the rear surfaces of portions of the focus and manual override structures.

According to the present invention, a manual override device, which may be coupled selectively to a focus adjusting device, is mounted concentrically with the taking lens axis. Referring to FIGS. 2 and 3, a shutter mechanism plate 18 supports the usual negative lens mount 20, which is secured to the mechanism plate by a pair of stop screws 22 and an assembly screw 24, extending into threaded holes such as 23 in mount 20. A ring flange 26 on the negative lens mount 20 extends toward the front of the camera and supports a bearing member 28, which is also mounted on plate 18 by screws 22 and 24.

A manual override ring 30 having a cam surface 29 is secured by an ear 31 against rotational movement relative to a manually rotatable selector, or index ring 32, the ear 31 cooperating with a notch 27 in the rear surface of ring 32. Rings 30 and 32 are mounted on bearing 28 for rotation thereon. A tension washer 34 rests against an internal flange 33 in the index ring 32 and spaces flange 33 from the rear surface of an index cup 36. The index cup is secured to the mechanism plate 18 by screws 22 and 24, which extend through a central aperture 35 in flange 33 of the index ring. Therefore, ring 32 and cam ring 30 are manually rotatable as a unit against the friction of the tension washer 34, while index cup 36, bearing 28 and the rear lens mount 20 remain stationary relative to the mechanism plate.

A front lens mount 38 is in threaded engagement with the negative lens mount 20, extending through a ring flange 39 in the index cup 36 and further extending through the central apertures of tension washer 34, the index ring 32, cam ring 30 and bearing 28. The front lens mount 38 also extends through a stop ring 40, a tension washer 44, a range indicator cam 46 and a detent spring 48. The detent spring 48 is secured to the front surface of ring flange 39 in the index cup by screws 22 and 24 and therefore is stationary relative to the mechanism plate 18. Stop ring 40, tension washer 44 and range indicator cam 46 are secured together by a pair of stop pins 42. A focus cap 52 fits over the front lens mount 38 and, along with an assembly ring 54, is secured to the stop ring 40 by a pair of screws 56. The focus cap 52 is rotated manually for focus adjustment and is yieldably retained in any of a plurality of angular positions by a detent 50 on spring 48, engaging peripheral notches, such as 37, on the rear surface of cap 52. The front lens mount 38, the stop ring 40, the tension washer 44 and the range indicator cam 46 rotate with the focus cap. The stop pins 42 cooperate with stop screws 22 for limiting the rotation of the front lens mount. A filter holder 58 is in threaded engagement with the front of the focus cap to complete the assembly.

A pointer 70 on the index cup 36 cooperates with a distance scale 71 on the focus cap to indicate the selection of a focus setting as a function of the rotated position of the focus cap relative to the index cup.

A latching, or detent lever 60 is secured by a stud 64 in a hole 65 in the rear surface of the index ring 32 and has an ear 61 which is urged radially inward toward the lens axis by a spring 62. During daylight operation of the camera the detent ear 61 engages a notch 66 in the periphery of the index cup 36 and maintains the focus cap 52 uncoupled from the index ring 32 and cam ring 30. During daylight operation the sensing member 16 cooperates with a galvanometer pointer (not shown) to adjust the diaphragm opening of a camera in the manner well known in the art and disclosed for example in the above mentioned Tuttle Patent 2,058,531. At this time cam 29 on ring 30 lies in an angular position where it is beyond the path of a second sensing member 17, which is integral with the first sensing member 16.

In order to adjust the camera for flash operation, detent lever 60 is rocked manually against the tension of spring 62, thereby lifting ear 61 out of notch 66 in the index cup 36. While the detent lever is thus held out of engagement with the index cup, the index ring 32 is rotated manually to align a pointer 78 thereon with any one of a plurality of flash guide numbers 73 on the periphery of the focus cap 52. Movement of ring 32 also aligns ear 61 of detent lever 60 with an elongated slot 68 in index cup 36 and with one of a plurality of notches 72 on cap 52, corresponding to the flash guide numbers. In the embodiment illustrated, each notch 72 is shown opposite its corresponding flash guide number. When lever 60 is released it is rocked by spring 62 to insert ear 61 through slot 68 of index cup 36 and into engagement with the aligned notch 72 in focus cap 52. This locks ring 32 and the manual override cam ring 30 into an angular relationship with focus cap 52 representing the selected flash guide number. Therefore, subsequent rotation of the focus cap adjusts cam surface 29 to a position which is a joint function of the selected guide number and focus adjustment. In turn, cam 29 cooperates with the second sensing member 17 on cam 16 to limit the movement of the latter, and thereby adjust the diaphragm mechanism, as a joint function of the guide number and focus adjustment.

An index mark 76 on the index ring cooperates with a fixed mark 80 (FIG. 1) on the camera front to indicate the adjustment of the index ring to its daylight position, described above, wherein ring 32 and cam 30 are uncoupled from focus cap 52.

The invention has been described in detail with particular reference to a preferred embodiment thereof, but it will be understood that variations and modifications can be effected within the spirit and scope of the invention as described hereinabove and as defined in the appended claims.

We claim:

1. In a photographic camera wherein movement of a first sensing member is limited automatically as a function of scene brightness for setting a diaphragm opening in accordance with scene brightness, and having a focus adjusting ring concentric with the axis of a taking lens, the combination comprising: a second sensing member coupled to said first sensing member and moving in timed relation therewith in a predetermined path; a manually rotatable selector ring concentric with said lens axis; an override ring concentric with said lens axis and having a cam surface adapted for cooperation with said second sensing member, said override ring being secured to said selector ring for angular movement therewith; and latching means having disabled and enabled conditions of operation and adapted, when enabled, for coupling said selector ring and said override ring to said focus ring, said selector ring having a first angular position for maintaining said latching means disabled and for maintaining said cam surface out of the path of said second sensing member and having a range of angular positions for enabling said latching means to couple said selector ring and said override ring to said focus ring in any of a plurality of angular relationships representing selectable flash guide numbers, said selector ring in each position within said range maintaining said cam surface in a corresponding position for intercepting said second sensing means, thereby to set said diaphragm opening as a joint function of the adjustment of said focus ring and the selected flash guide number.

2. In a photographic camera wherein movement of a first sensing device is limited automatically as a function of scene brightness for setting a diaphragm opening in accordance with scene brightness, and having focus adjusting means, the combination comprising: a second sensing device coupled to said first sensing device and moving in timed relation therewith in a predetermined path; a manual override cam adapted for cooperation with said second sensing device; and selector means coupled to said cam having an initial position for maintaining said cam out of the path of said second sensing device to permit automatic diaphragm setting, said selector means being adjustable away from its initial position and to any of a range of coupling positions for coupling said cam to said focus adjusting means in any of a plurality of positional relationships representing selectable flash guide numbers, whereby adjustment of said focus adjusting means also adjusts said cam to a position for intercepting said second sensing means to set said diaphragm opening as a joint function of the focus adjustment and the selected flash guide member.

3. In a photographic camera wherein an exposure control system is adapted for automatically establishing a diaphragm opening as a function of scene brightness, and having focus adjusting means, the combination comprising; manual override means selectively operable for establishing a diaphragm opening in overriding relation to said exposure control system; means normally maintaining said manual override means disabled and uncoupled from said focus adjusting means; and manually operable means for selectively enabling said manual override means and for coupling the latter to said focus adjusting means in any of a plurality of positional relationships representing selectable flash guide numbers, whereby adjustment of said focus adjusting means also adjusts said manual override means for establishing a diaphragm opening as a joint function of the focus adjustment and the selected flash guide number.

References Cited in the file of this patent

UNITED STATES PATENTS

| | | |
|---|---|---|
| 2,315,977 | Mihalyi | Apr. 6, 1943 |
| 2,917,983 | Gebele | Dec. 22, 1959 |
| 2,926,571 | Sommer | Mar. 1, 1960 |
| 2,936,690 | Whitman | May 17, 1960 |